A. A. SAINTE.
Rotary Speed Indicator.
No. 211,274.  Patented Jan. 7, 1879.
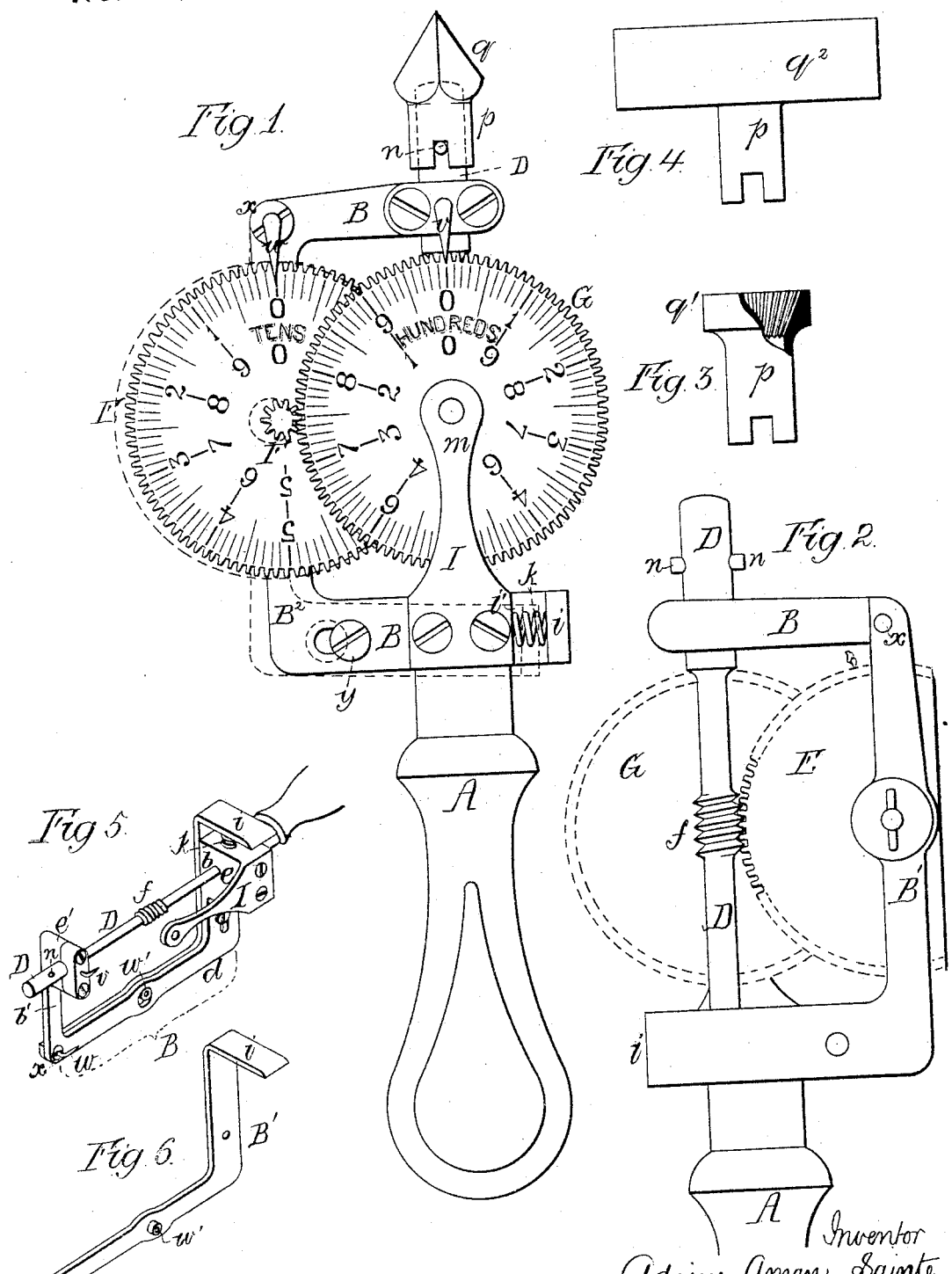

UNITED STATES PATENT OFFICE.

ADRIEN AMAN SAINTE, OF PARIS, FRANCE.

IMPROVEMENT IN ROTARY SPEED-INDICATORS.

Specification forming part of Letters Patent No. 211,274, dated January 7, 1879; application filed July 22, 1878.

*To all whom it may concern:*

Be it known that I, ADRIEN AMAN SAINTE, of the city of Paris, in the Republic of France, have invented a new and useful Improvement in Speed-Indicators, of which the following is a specification:

The object of my invention is to make a cheap and effective speed-indicator which can be held in one hand and applied to the shaft or other rotating object the speed of which has to be tested; and this object I attain in the manner which I will now proceed to describe, reference being had to the accompanying drawing, in which—

Figure 1 is a front view of the speed-indicator; Fig. 2, a rear view of part of the instrument; Figs. 3 and 4, views of tools which may be attached to the main shaft of the indicator; Fig. 5, a perspective view of the main and pivoted frames of the indicator without the gearing, and Fig. 6 a detached perspective view of the pivoted frame.

To a suitable handle, A, is secured the main frame B, composed, in the present instance, of the two legs $b\ b'$ and connecting-bar $d$, (see Fig. 5;) and to bearings $e\ e'$ on this frame is adapted a shaft, D, having a worm, $f$, geared to a cog-wheel, E, hung loosely to a pin which is screwed into a hub, $w'$, projecting from a second frame, B', the latter, which is shown in perspective in Fig. 6, being pivoted to the back of the main frame by a set-screw, $x$, and being further confined to the same by a set-screw, $y$.

The pivoted frame B' has a projection, $i$, between which and the bearing $i'$ on the main frame intervenes a spring, $k$, tending to maintain the pivoted frame in a position coincident with the main frame, but permitting the former to be depressed to the extent indicated by dotted lines in Fig. 1, thereby moving a pinion, F, on the wheel E out of gear with a cog-wheel, G, hung loosely to a pin, $m$, on a bracket, I, secured to the main frame. In order to permit this movement of the pivoted frame, the openings in the main frame for the hub $w'$ and set-screw $y$ are elongated.

The end of the shaft D is provided with two projecting pins, $n\ n$, and different devices may be adapted to this end of the shaft, as the character of the rotating object the speed of which has to be tested may suggest. In Fig. 1, for instance, a slotted socket, $p$, adapted to the shaft D, is provided with a tapering projection, $q$, of triangular section, and having consequently three sharp edges, so that on holding the instrument in the hand, introducing the point $q$ into the centering-hole at the end of a shaft, and holding it there under pressure, the shaft D will be rotated at the same speed as the shaft to be tested.

In the device, Fig. 3, the slotted socket has an enlargement, $q^1$, containing a tapering recess provided with sharp internal ribs, so that when the enlargement is fitted over and pressed against the end of a rotating spindle, the socket, and with it the shaft D, must revolve with the spindle.

The socket $p$, in Fig. 4, is secured to a wheel or disk, $q^2$, of a determinate diameter, the periphery of the wheel being held against a revolving object, so as to be turned by frictional contact therewith.

The pinion F has, in the present instance, ten teeth, and each of the wheels G and E has a hundred teeth, and is marked with a like number of radial graduations, arranged in groups of ten, which are numbered by two sets of figures, arranged in reverse order, one set counting from zero to the right, and the other set counting from zero to the left, so that it is immaterial whether the wheels G and E are revolved either to the right or left.

To the main frame are attached two pointers, $v$ and $w$, the former projecting over the wheel G and the latter over the wheel E.

As a single threaded screw constitutes the worm $f$, one revolution of the shaft D will insure the turning of the wheel E to the extent of one-hundredth of a revolution, and one complete revolution of the wheel E will insure one-tenth of a revolution of the wheel G.

It will be readily understood how, with the aid of a watch or other time-keeper, the number of revolutions made by the shaft D in a minute can be determined by observing the relation of the graduations on the two wheels to the pointers at the conclusion of a minute's application of the instrument to the rotating object to be tested.

It will be understood that before applying the instrument the wheels must be so adjusted that their zero-marks shall coincide with the pointers, and the pivoted frame permits the ready adjustment of the wheels, for when the instrument is held in the right hand the thumb of the same hand may be placed on the projection $i$ of the pivoted frame, so as to depress the latter until the pinion F is out of gear with the wheel G, when both the latter wheel and the wheel E will be at liberty to be adjusted by the other hand, after which pressure may be removed from the pivoted frame, when the pinion will be again in gear with the wheel G, and the latter, as well as the wheel E, will be under the sole control of the shaft D.

I claim as my invention—

1. The combination of the main frame B, and the wheel G and shaft D, adapted to bearings carried by the said frame, with the pivoted frame B', and the wheel E and pinion F, carried by the latter frame, all substantially as described.

2. The combination of the main frame of the indicator and its handle A with the pivoted frame and its projection $i$, arranged in respect to the handle as specified.

3. The combination of the frame B, its shaft D, and wheel G with the pivoted frame B', carrying the wheel E and pinion F, and acted upon by a spring, $k$, as specified.

In testimony whereof I have signed my name to this specification in the presence of two subscribing witnesses.

ADRIEN AMAN SAINTE.

Witnesses:
C. MOINEAU,
ROBT. M. HOOPER.